US007340577B1

(12) United States Patent
Van Dyke et al.

(10) Patent No.: US 7,340,577 B1

(45) Date of Patent: Mar. 4, 2008

(54) METHOD AND SYSTEM FOR EFFICIENTLY EXECUTING READS AFTER WRITES IN A MEMORY EMPLOYING DELAYED WRITE DATA

(75) Inventors: James M. Van Dyke, Austin, TX (US); John S. Montrym, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 166 days.

(21) Appl. No.: 10/158,316

(22) Filed: May 29, 2002

(51) Int. Cl.
*G06F 13/26* (2006.01)

(52) U.S. Cl. ...................................... 711/169; 711/167

(58) Field of Classification Search ................ 711/154, 711/108, 216, 169
See application file for complete search history.

(56) References Cited

U.S. PATENT DOCUMENTS 5,515,325 A * 5/1996 Wada .................... 365/189.01
5,870,625 A * 2/1999 Chan et al. .................... 710/5
6,044,429 A * 3/2000 Ryan et al. ................. 710/305
6,081,478 A * 6/2000 Mick et al. ................. 365/233
6,275,919 B1 * 8/2001 Johnson ...................... 711/216
6,351,427 B1 * 2/2002 Brown .................. 365/230.03
6,360,307 B1 * 3/2002 Raftery et al. .............. 711/169
2003/0110350 A1 * 6/2003 McGee et al. ............. 711/108

OTHER PUBLICATIONS

Louis E. Frenzel, "Use CAMs To Increase Line Speeds," Electronic Design, Sep. 17, 2001 (Online ID# 3704).*

* cited by examiner

*Primary Examiner*—Donald Sparks
*Assistant Examiner*—Jesse Diller

(57) ABSTRACT

A method and system for efficiently executing reads after writes in a memory. The system includes a memory controller and a memory core interfacing with the memory controller. The memory operates with a read data latency and a similar write data latency, and the memory immediately processes a read in a read-after-write situation. The system further includes a control circuit for controlling the memory and detecting an address collision between the read and a previously issued write and, in response thereto, stalling the memory by delaying issuance of the read to the memory until after the previously issued write completes.

39 Claims, 10 Drawing Sheets

300

METHOD AND SYSTEM FOR EFFICIENTLY EXECUTING READS AFTER WRITES IN A MEMORY EMPLOYING DELAYED WRITE DATA

BACKGROUND OF THE INVENTION

1. Field of the Invention

Embodiments of the present invention relate to the field of electronic memory devices. More specifically, embodiments of the present invention relate to improving read after write execution performance for memory systems that employ delayed write data, e.g., a dynamic random access memory (DRAM) device.

2. Related Art

FIG. 1 illustrates a timing diagram 20 of a typical read command ("read") being executed within a memory device, e.g., a dynamic random access memory (DRAM). In this example: AL=1; $t_{RCD}$=8; CL=7; RL=(AL+CL)=8; and WL=(RL−1)=7. The read command begins execution by the memory at the read CAS command 22*a* which is shown at clock cycle 7. At this point, the read address is also presented. However, there is a read latency 24, between the time the CAS command 22*a* is presented and the time that the data 22*b* associated with the read command is actually presented by the memory. In the example shown in FIG. 1, the read latency, $t_{RL}$, is approximately 8 clock cycles because the data 22*b* is presented at cycle 15. The read data is delayed because the DRAM device needs time to access the data located at the read address and present it onto the bus.

However, for a write command ("write"), no latency is required because the write address and the write data can be presented to the memory device at the same time. Some DRAM manufacturers therefore execute the read with a read data latency but do not impose a write data latency for writes. On the other hand, some DRAM specifications are showing writes with delayed write data by some predetermined number of clocks after the write CAS command. This is done to enable short write after read turnaround times because their CAS commands and data can be pipelined.

FIG. 2A illustrates a timing diagram 26 of a short write after read turnaround time for a DRAM that utilizes delayed write data operation, e.g., the write data is delayed to match the intrinsic read data latency. In this example: Additive Latency (AL)=1; $t_{RCD}$=8; CAS Latency (CL)=7; Read Latency (RL)=(AL+CL)=8; and Write Latency (WL)=(RL−1)=7. At clock 7 the CAS command 30*a* for the read is issued. Four clocks later, at clock 11, the CAS command 32*a* for the write is issued before the read is completed. After the read data latency period 34, at clock 15, the data 30*b* for the read is presented on the bus. At clock 18, after an imposed write data latency 36, the data 32*b* corresponding to the write is presented on the bus. By providing the write data latency 36, the DRAM allows the write following the read to be pipelined to increase performance.

Unfortunately, as shown in FIG. 2B, DRAMs that employ a write data delay cause read-after-write times to be on the order of the CAS latency because the DRAM specification requires that the write complete before issuing the subsequent read. In this example: AL=0; $t_{RCD}$=8; CL=7; RL=(AL+CL)=7; WL=(RL−1)=6; and $t_{CDLR}$=4. As shown in FIG. 2B, the CAS command 40*a* for the write is issued at clock 0. The data 40*b* associated with the write is then presented after the write data latency at clock 6. However, the read CAS command of the subsequent read operation may not be presented before the data 40*b* for the write is stored in the memory. This is done to prevent stale data from being returned to the subsequent read. Therefore, the subsequent read CAS command 42*a* is issued at clock 12, and its data 42*b* is returned at clock 19. Using this DRAM memory, the read is not issued until 12 clocks (2+6+4) after the write command 40*a* as shown by length 46. A series of NOPs 44 is inserted by the DRAM specification to delay the read instruction. Issuing the read any sooner would possibly return stale data not from the latest write to the read address, or alternatively, could cause address decode contention within the memory device.

However, this delay period 44 inserted for the read-after-write situation of FIG. 2B can severely reduce the performance of the DRAM memory. It would be advantageous to provide the write-after-read pipelining available to the DRAM of FIG. 2A without suffering the performance degradation caused by the read-after-write situation of FIG. 2B.

SUMMARY OF THE INVENTION

Therefore, one embodiment of the present invention provides a memory having delayed write data to allow short write-after-read pipelining but without delaying reads until writes complete in the read-after-write situation. The present invention provides a mechanism and method for efficiently performing reads after writes using a memory that provides delayed write data. An embodiment of the present invention provides such a mechanism and method that is operable with dynamic random access memory devices.

A logic circuit is described herein to improve efficiency of read after write execution. The logic circuit may be used in conjunction with a DRAM memory having delayed write data, e.g., the memory operates such that its write data is delayed from the write command/address information. The logic circuit operates to maintain data coherency between a read that is processed just after a write, e.g., a read-after-write situation. The logic circuit may be implemented within a DRAM controller circuit.

In one embodiment, the logic circuit examines the address of a current read for a match with an address of a previous write that is within a small window of previously encountered writes (stored in a history buffer). An address collision detection circuit may be used. In one embodiment, the address collision detection circuit compares the current read's row, bank, column address (or a subset or hash thereof) to all write addresses within a history buffer. In a first embodiment, if there is an address match, then the current read is delayed (e.g., a stall occurs) until the DRAM core has stored the data associated with the matching write to prevent stale data from being returned to the read. If there is no match, then the subsequent read is immediately dispatched (e.g., subject to the data bus DQS turnaround time) and the returned data is utilized.

In another embodiment, the logic circuit does not stall in response to a hit but rather the data requested by the current read is located within (and supplied by) the logic circuit which maintains a small queue of data associated with the previously encountered writes. The data supplied by the logic circuit bypasses any data obtained from the memory core in response to the current read in order to prevent stale data from being returned to the read. In other words, in this second embodiment, if the current read's row, bank, column address (or subset or hash thereof) matches any write address within the history window, then the most recent previous write data is forwarded to replace the incorrect stale read data from the DRAM device. Like the first embodiment, if there is no match, then the subsequent read is immediately dispatched (e.g., subject to data bus DQS turnaround time) and the returned data is utilized. In an alternative embodiment, the data is forwarded only when all byte write enables from the "hit" write have been set. Otherwise, a read is done and the read data and the accumulation of the latest byte write enabled data in the history window are merged for the read back. However, this solution is very hardware intensive. The preferred embodiment being rather to stall the read on the occasion if there is a write "hit" in the history window and all write enables are not set.

More specifically, an embodiment of the present invention is directed to a control circuit for interfacing with a memory controller which controls a memory core, the control circuit comprising: a buffer memory for storing addresses of a set of previously dispatched writes; compare logic for comparing an address of a current read against the addresses of the set of previously dispatched writes stored in the buffer memory, the compare logic for generating a hit signal upon an address match thereof; and responsive to the hit signal, stall circuitry for stalling the memory controller for a plurality of clock cycles before the current read is allowed to be processed, and wherein the memory controller, for each write, presents write data to the memory core after a predetermined latency from receiving a corresponding write command. An embodiment includes the above and wherein, provided no match is detected, said memory controller allows the current read to be dispatched before the completion of a just preceding write.

An embodiment of the present invention is directed to a control circuit for interfacing with a memory controller which controls a memory core, the control circuit comprising: a first buffer memory for storing addresses of a set of previously dispatched writes; a second buffer memory for storing data corresponding to each write of the set of previously dispatched writes; compare logic for comparing an address of a current read against the addresses of the set of previously dispatched writes stored in the first buffer memory, the compare logic for generating a hit signal upon an address match thereof; and responsive to the hit signal corresponding to a latest matching write, bypass circuitry for providing data from the second buffer to satisfy the current read, the data corresponding to the latest matching write, and wherein the memory controller, for each write, presents write data to the memory core after a predetermined latency from receiving a corresponding write address.

DETAILED DESCRIPTION OF THE INVENTION

Reference will now be made in detail to the preferred embodiments of the present invention, a method and a system for improving read after write execution performance for memory systems that employ delayed write data, e.g., a dynamic random access memory (DRAM) device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Memory Stall Embodiment

Figure 1:
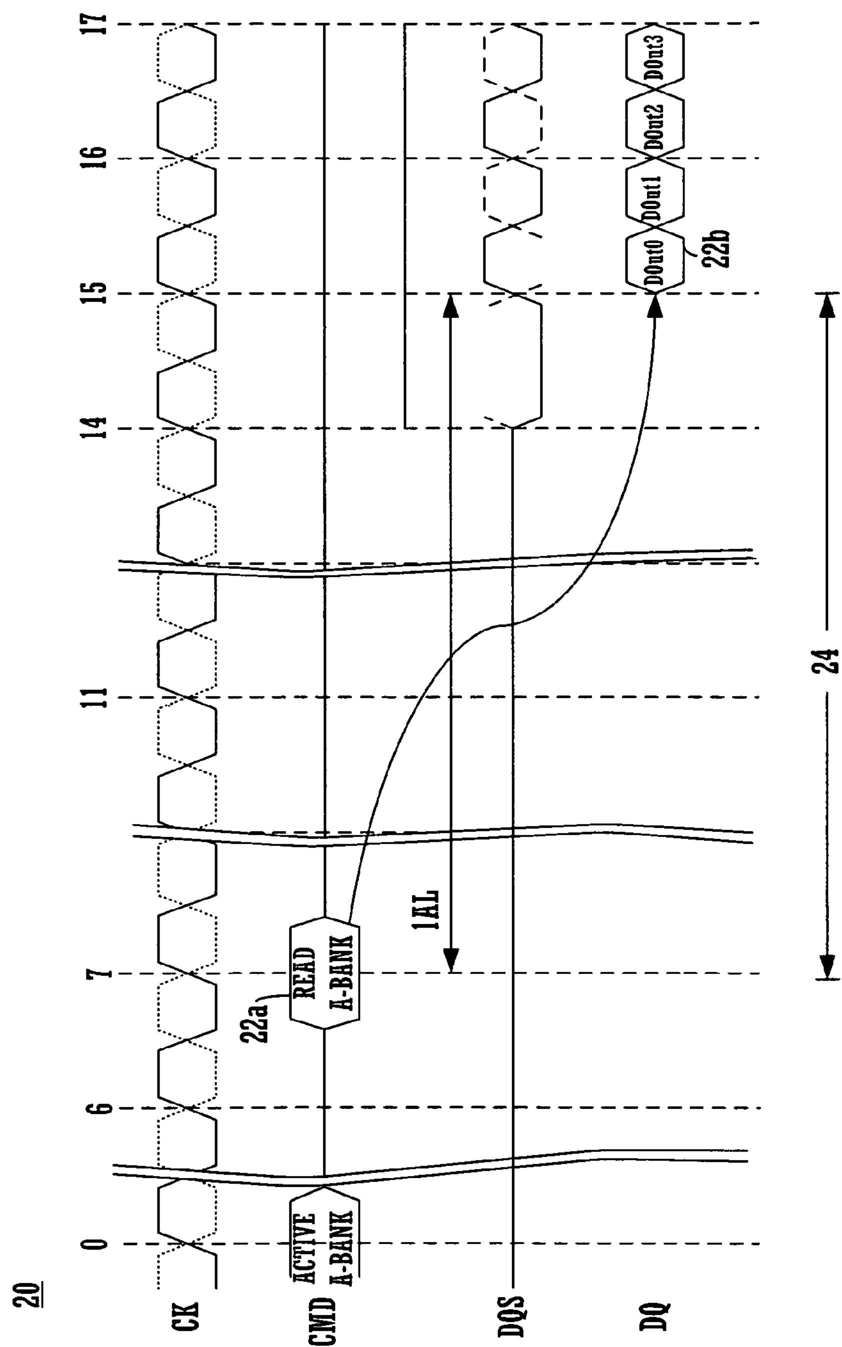
FIG. 1 is a prior art timing diagram of the execution of a read by a DRAM memory and illustrates the read data latency.
Figure 2A:
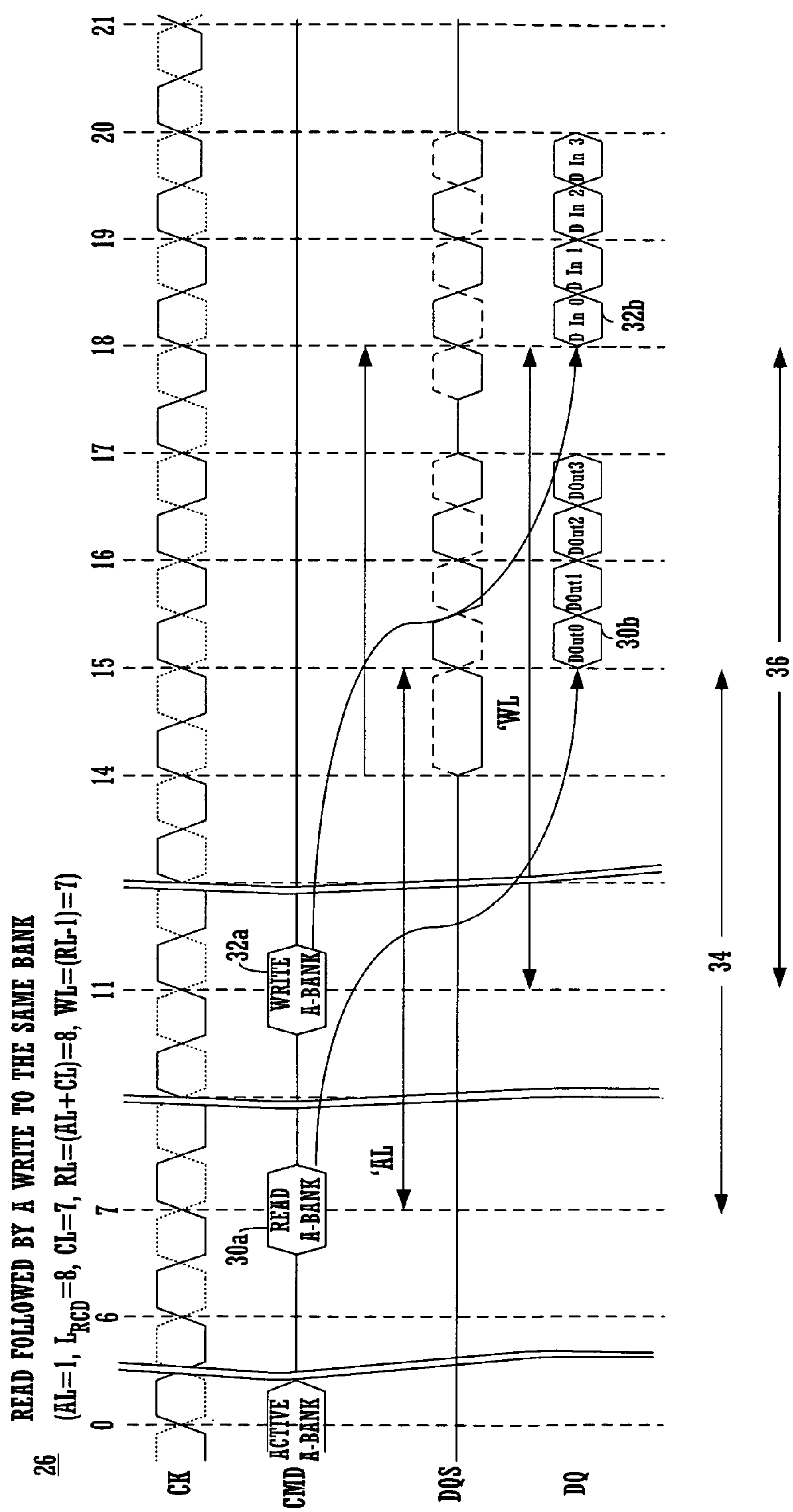
FIG. 2A is a prior art timing diagram of the execution of a write just following a read and illustrates a pipelining of the read and write data latencies.
Figure 2B:
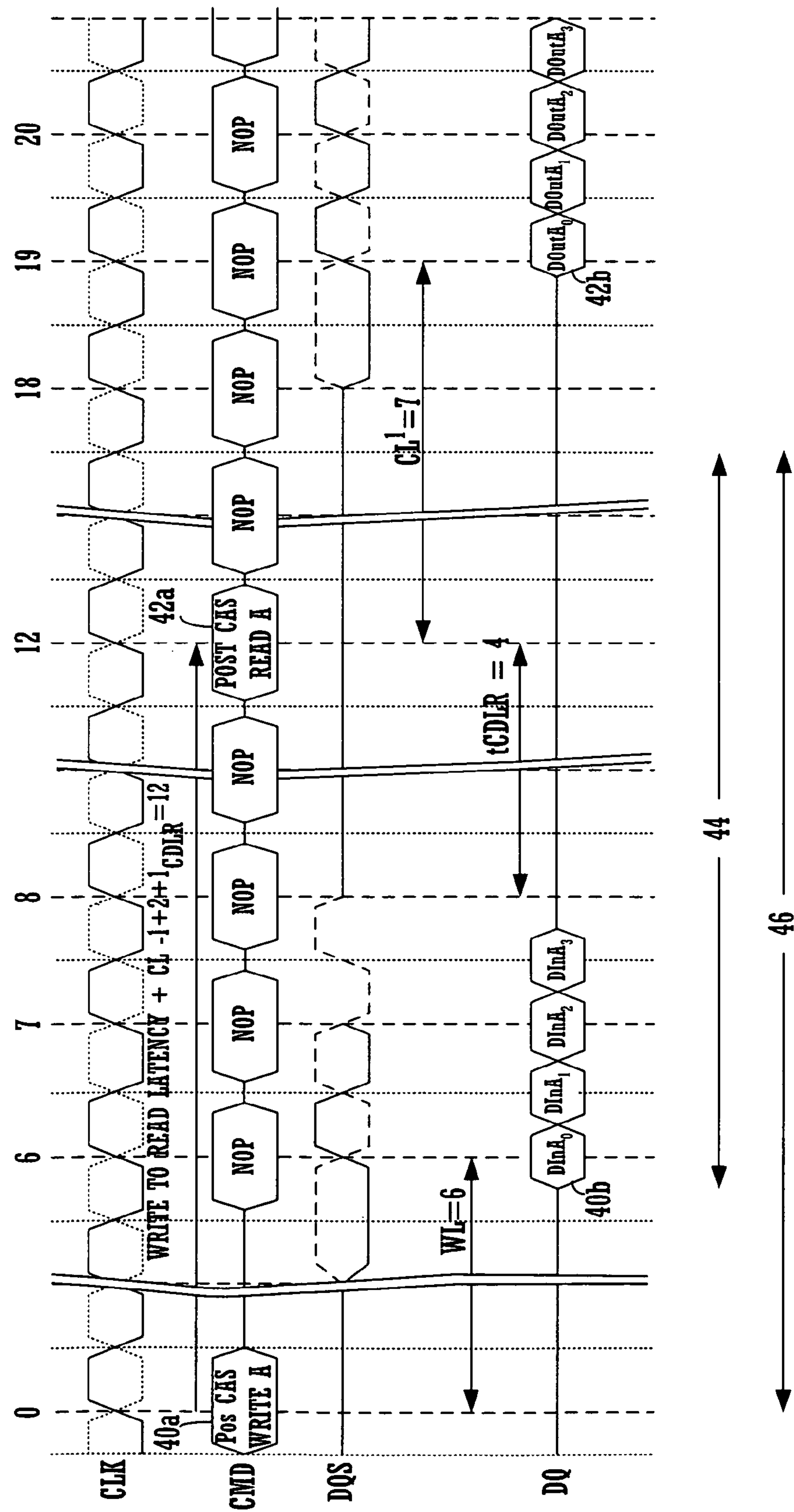
FIG. 2B is a prior art timing diagram of the execution of a read just following a write and illustrates a delay added by the prior art DRAM memory to the start of the read thereby preventing stale data from being returned to the read.
Figure 3A:
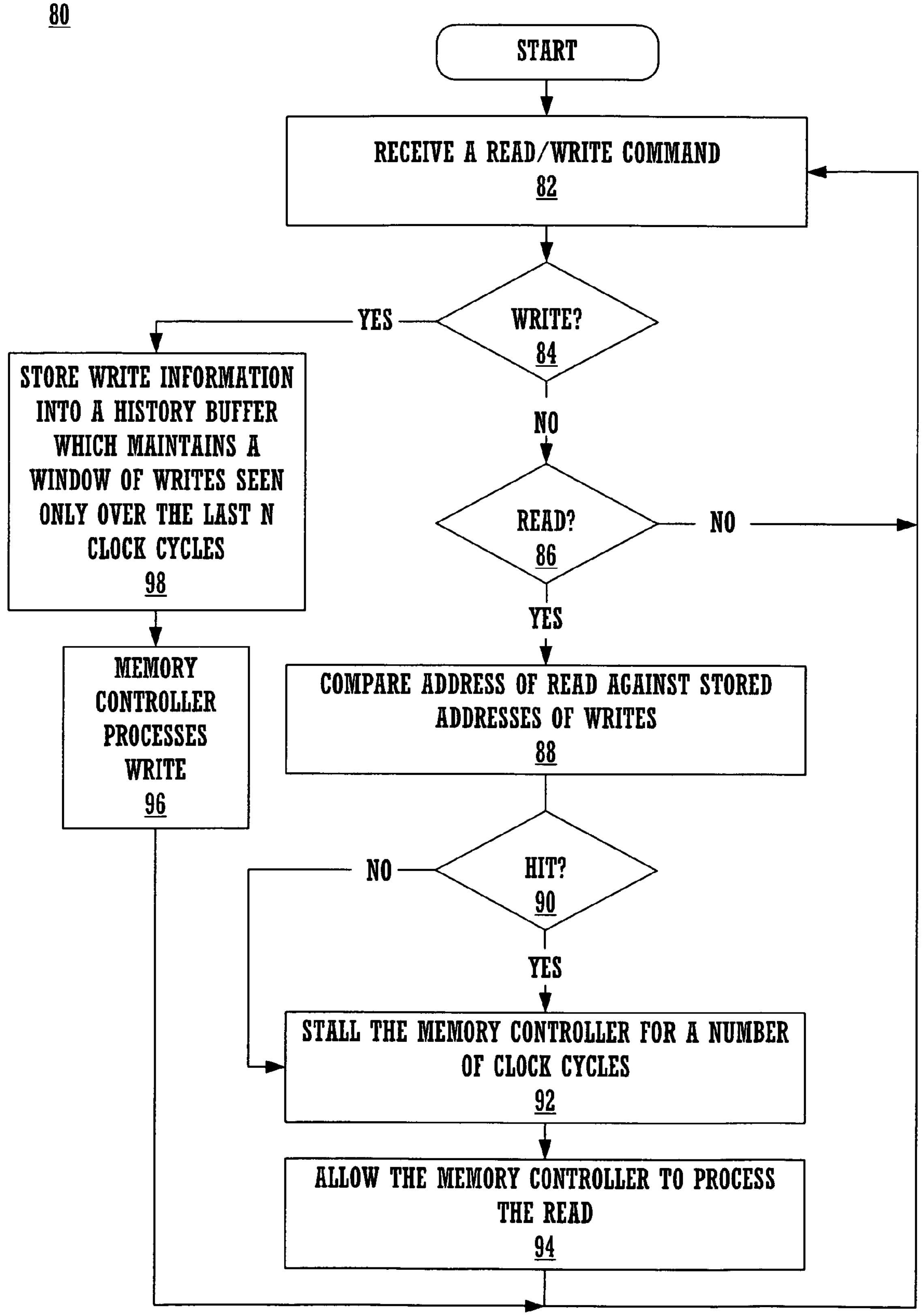
FIG. 3A is a flow diagram of a first embodiment ("stall embodiment") of the present invention for providing an efficient read after write execution for memories having delayed write data.

FIG. 3A illustrates a flow diagram 80 performed by one embodiment of the present invention to allow efficient read-after-write implementation in a memory circuit having delayed write data. The memory circuit has been designed to allow efficient dispatching of a write-after-read (to allow pipelined execution thereof) and, in accordance with the present invention, the memory also allows efficient dispatching of a read-after-write (e.g., without always imposing latency 44 as shown in FIG. 2B). In one embodiment, the memory is a DRAM memory having a DRAM controller and may use a bi-directional bus. In the read-after-write situation, the present invention provides control logic for maintaining data coherency in the situations when the current read is addressing the same address as written by a previously dispatched write. In these situations, the "DRAM is stalled" (e.g., the issuance of the read to the DRAM is delayed) until the write completes. However, for the situations where the current read is not requesting an address that has just been written, the read is allowed to be dispatched early, thereby increasing memory performance.

According to the flow diagram 80 of FIG. 3A, a read or write command is received at 82. Checks are made if the command is a write or a read at 84 and 86 respectively. These checks can be made simultaneously or in any order.

If the command is a write, then at 98 the address (or a hash thereof) of the write is stored into a history buffer which drains the bottom entry of its contents on each clock cycle (with each entry being shifted down by one). Therefore, the history buffer contains only write address information over a window of the last N clock cycles. The write is then dispatched at 96.

On the other hand, if the command is a read, then the address (or a hash thereof) is compared against all of the address information maintained within the history buffer at 88. These compares can be done simultaneously at 90. If a hit occurs, then at 92, the memory (e.g., DRAM controller) is "stalled" for a number of clock cycles, e.g., the issuance of the read is delayed for the number of clock cycles. As the stall condition exists, the history buffer is allowed to drain on each clock cycle. The history buffer is programmed in length (or, physically constructed to be a particular length) such that when a matching write drains out of the buffer, it will have completely executed within the memory. Essentially, the stall time is automatically adjusted in this way such that it is always sufficient (e.g., longer than the hazard period) to allow the matching write to complete execution before the current read is dispatched. After that time period elapses, then at 94, the current read is allowed to be dispatched.

Importantly, if no match occurs at 90, then the current read is allowed to be dispatched immediately (e.g., subject to the data bus DQS turnaround time which is about 1 clock cycle) and no additional delay is added. In one embodiment, the current read can be dispatched in as many as 4 clock cycles after the last write takes place in the read-after-write miss situation, unlike the 12 clock cycles that are required in the prior art (FIG. 2B).

It is appreciated that the stall condition exists to allow the matching write to complete before the current read takes place. By so doing, the current read will receive the data from the matching write and not stale data from the memory.

Figure 3B:
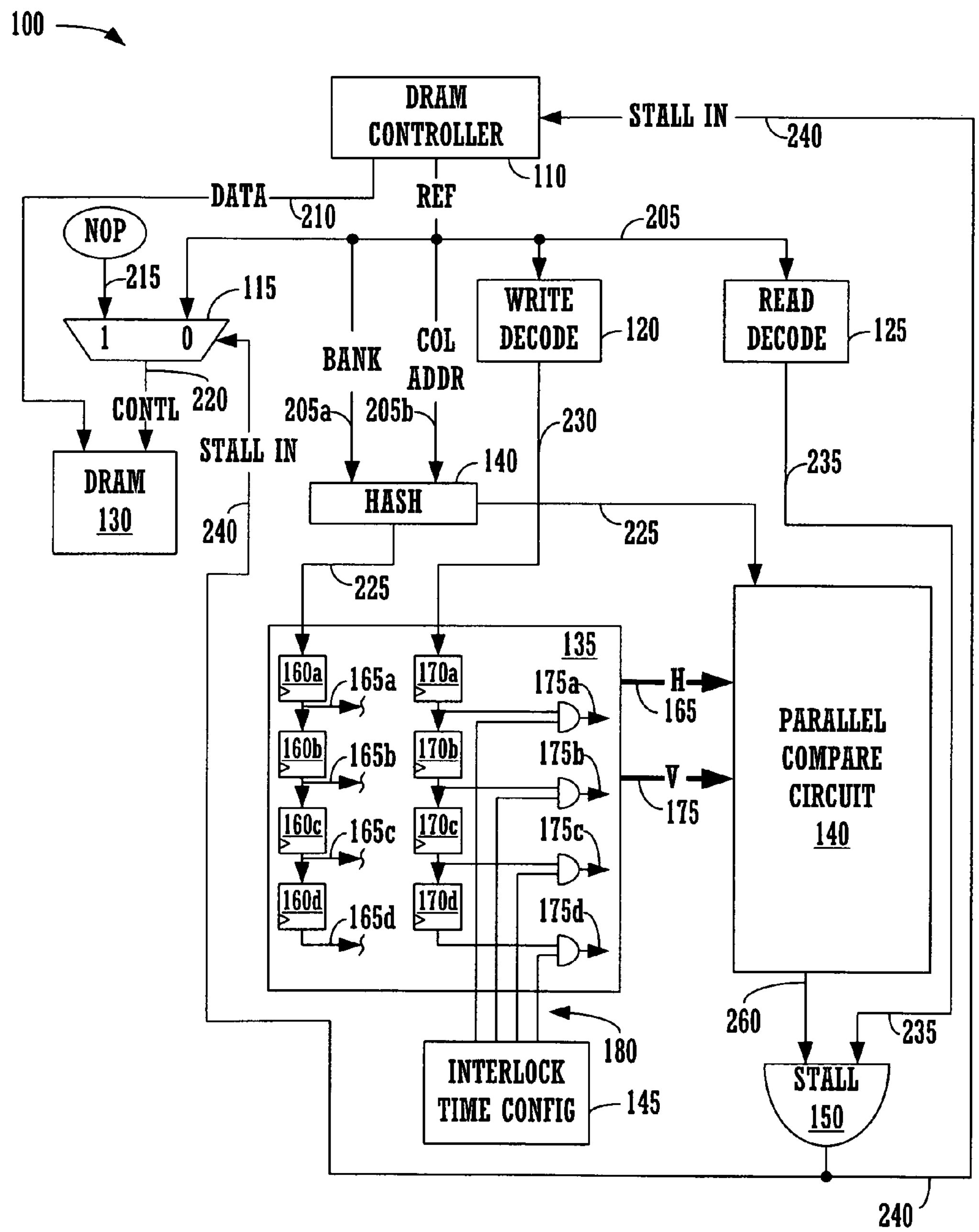
FIG. 3B is a circuit diagram of a logic circuit for implementing the first embodiment of the present invention.

FIG. 3B illustrates one circuit implementation of the stall embodiment of the present invention. Although shown as separate from the DRAM controller 110, it is appreciated that the control logic 100 of the present invention may be implemented within the same ASIC as the DRAM controller 110 or it may be implemented separate therefrom. Alternatively, the control logic and/or the DRAM controller can be incorporated into the DRAM chip.

The DRAM controller provides a reference bus 205 which includes the RAS signals, CAS signals, write enables (WE_), chip select control (CS_), address signals, and bank signals, etc., for the memory. These signals are well known DRAM signals. A bi-directional data bus 210 is also shown. Writes and reads are detected by a write decode circuit 120 and a read decode circuit 125 (respectively) both being coupled to reference bus 205. Reads are decoded over line 235 and writes are decoded over line 230. Bank 205*a* and column address 205*b* of the current reference 205 may be hashed by optional hash circuit 141 to create a key using fewer bits, if desired. Alternatively, the address values (or portions thereof) can be used directly. The preferred embodiment uses a 1:1 hash or a straight through function.

In one embodiment, only the bank and column bits are needed for complete collision detection since tRP+tRCD>tW2R on typical DRAMs where: tRP represents precharge to activate time; tRCD represents activate to read or write time; and tW2R represents write to read turnaround for an address hit case. Also, accessing two different row addresses of the same bank are farther apart in time than the hazard period, so the preferred embodiment does not examine or store row address bits. It is appreciated that tRP+tRCD represents the time required to precharge and activate a row in the same bank. The value tW2R is the pertinent hazard time when reading after a write to the same address with regard to the hazard of potentially receiving stale data.

The output 225 of the hash circuit 141 is coupled to provide a key to parallel compare circuit 140. The output 225 of the hash circuit 141 is also coupled to provide a key to register 160*a* of the write history buffer 135. Clocked registers 160*a*, 160*b*, 160*c* and 160*d* are coupled together in a shifting fashion. For each key clocked into the history buffer 135, a corresponding valid bit exists and is clocked into shift registers 170*a*, 170*b*, 170*c* and 170*d*. The valid bits originate over line 230 from the write decoder 120. When a DRAM write is detected, its bank and column hash are written into the history buffer 135 via registers 160*a*-160*d*. In this fashion, hash keys and valid bits are shifted into history buffer 135 on each clock cycle.

The group of registers 160*a*-160*d* shift their contents one register forward toward the end of the chain on every clock. Write address information in the last register 160*d* is therefore discarded on the next clock cycle, e.g., "drained out." The same occurs regarding valid bits of the registers 170*a*-170*d*, e.g., the valid bit in the last register 170*d* is discarded on the next clock cycle. Therefore, the registers advance every clock. It is appreciated that after the hazard time has expired for a particular valid write, its write information will thereafter be shifted out of the end of the history buffer 135.

The interlock time configuration circuit 145 of FIG. 3B generates a number of enable signals 180, e.g., four, which are respectively ANDed with the outputs of the shift registers 170*a*-170*d* of the history buffer 135. The outputs of the AND gates are 175*a*-175*d*. According to this embodiment, circuit 145 serves to mask enable only the valid bits for the first few history buffer locations that correspond to the hazard time of receiving stale data if a read is performed after a write to the same address. Bottom disabled address history locations create misses. This way, DRAMs with different hazard periods can be accommodated by programming the enable signals generated by circuit 145. In one embodiment, the interlock time is less than the row precharge, activate time. Although shown as 4 deep in FIG. 3B, the interlock registers can be designed arbitrarily deep.

Hash keys (write addresses) output from each shift register 160*a*-160*d* over busses 165*a*-165*d* are shown collectively as bus 165 coupled to the parallel compare circuit 140. Likewise, corresponding valid bits output from each shift register 170*a*-170*d* over busses 175*a*-175*d* are ANDed with signals from an interlock time configuration circuit 145 and are provided collectively on bus 175. Bus 175 is coupled to the parallel compare circuit 140. Therefore the hash (address) information and valid bits for the locations of the history buffer 135 are coupled via bus 165 and bus 175 to the parallel compare circuit 140.

In one embodiment, the history buffer 135 and the parallel compare circuit 140 are combined and implemented with a content addressable memory (CAM) that includes a shifting capability. In another embodiment, rather than shifting the data within the CAM (i.e., the history data), pointers are used to indicate where the next hash value 225 is written, and the enable signals are rotated to account for the history data not being shifted.

In an alternate embodiment, the hash circuit 141 forms its output 225 by concatenating all of the bank 205*a* and column address 205*b* bits, making the hash circuit 141 much simpler (i.e., no logic), but producing more bits.

When a current read to the DRAM is requested, the hash of the current read's bank and column address is forwarded over line 225 to circuit 140. A compare is then made by circuit 140 of the current bank and column address hash with all of the enabled (and valid) hashes in the write address history buffer 135. This compares can be performed simultaneously. The compare results are qualified with the corresponding valid bit. If a match or "hit" is detected, then signal line 260 (the hit signal) is active. When line 260 is active and line 235 is active, then a hit is detected during a read. When a hit is detected during a read, a stall signal (over line 240) is generated by AND circuit 150 to the DRAM controller 110, and a NOP instruction is issued to the DRAM chip. The stall signal line 240 controls the select line of a multiplexer 115 and also controls the DRAM controller 110. The multiplexer 115 selects between a NOP position and the current read instruction as issued by the DRAM controller 110 (over the reference 205). The output of the multiplexer 115 is coupled to DRAM 130 over line 220 to issue the instruction or cause a NOP to be executed. It is appreciated that data bus 210 carries read/write data and DQM information.

Using the stall embodiment of the present invention increases memory performance because the hits are expected to be a rare occurrence. Read-after-write misses are only subject to write-to-read data bus turnaround penalties associated with the DRAM. Without this embodiment, every read after write would incur the maximum penalty.

Figure 4:
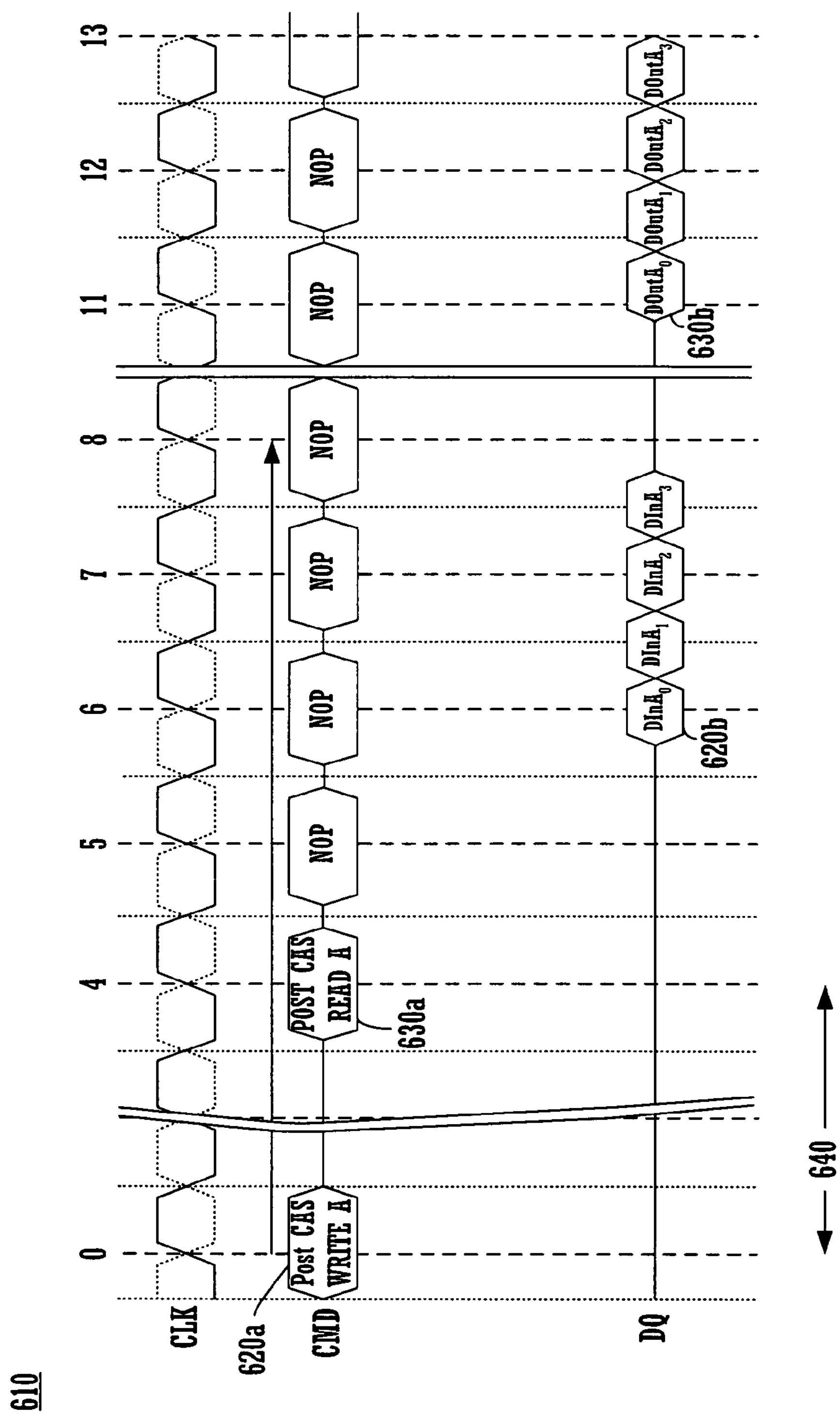
FIG. 4 is a timing diagram of an efficient read after write that may be performed in accordance with the first embodiment of the present invention provided their addresses do not coincide.

FIG. 4 illustrates a timing diagram 610 in accordance with an embodiment of the present invention for a read-after-write miss situation. In this situation, memory performance is increased according to the present invention. The write command 620*a* is received at clock cycle 0. Its data 620*b* is presented on the bi-directional bus at cycle 6. However, since the subsequent read command 630*a* does not access the same address as the write 620*a* (as detected by circuit 100), it is allowed to be issued at clock cycle 4. Its data is then returned at clock cycle 11. Therefore, there are only 4 clock cycles (period 640) between the write command 620*a* and the read command 630*a*, unlike the prior art (FIG. 2B) which requires from 11-12 cycles for the same situation. A performance gain of between 7-8 clock cycles is realized.

Non-Stall, Data Forwarding Embodiment

Figure 5A:
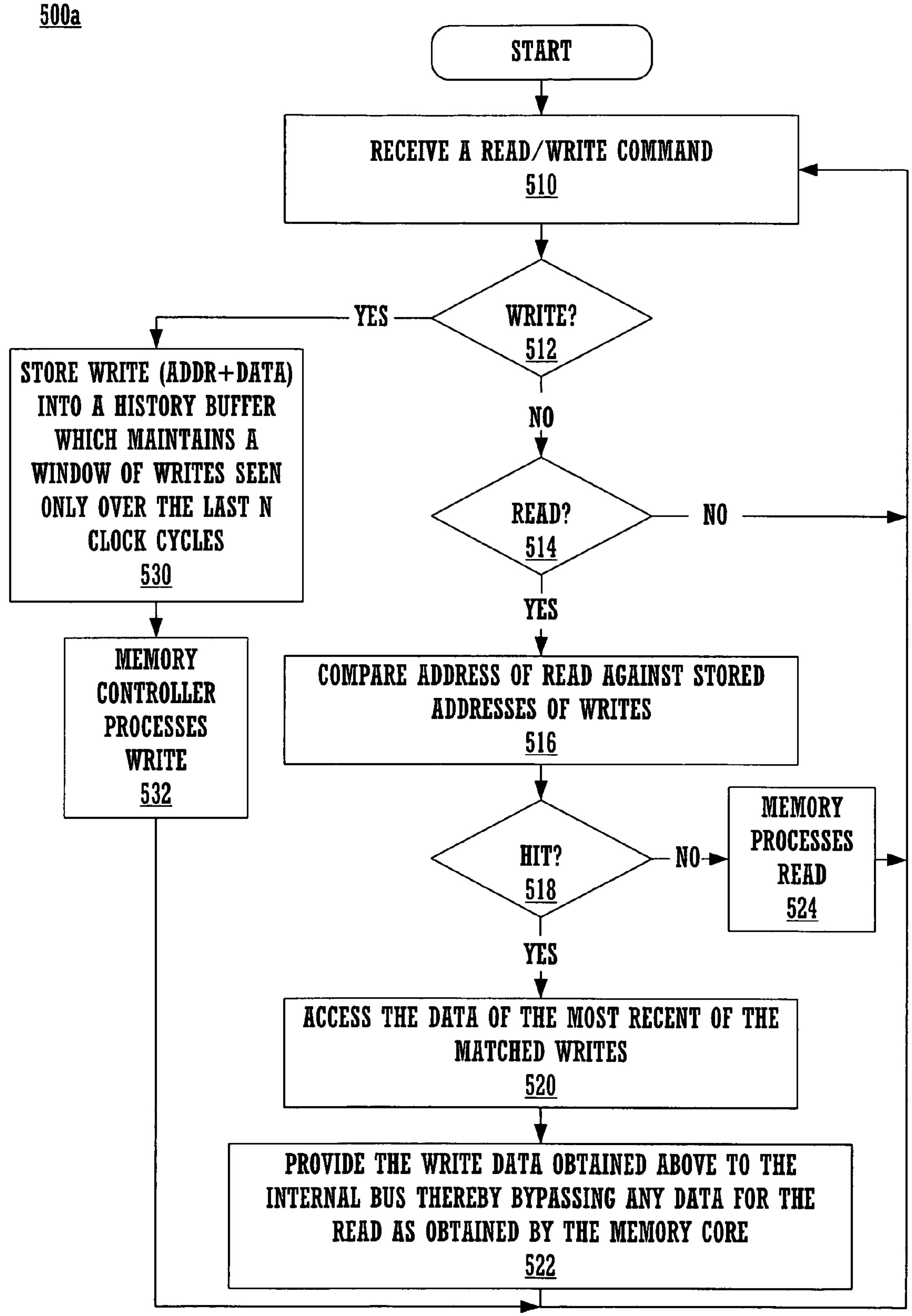
FIG. 5A flow diagram of a second embodiment ("non-stall embodiment") of the present invention for providing an efficient read after write execution for memories having delayed write data.

FIG. 5A is a flow diagram 500*a* illustrating steps performed by a second embodiment of the present invention for maintaining data integrity in read-after-write hit situations using the DRAM memory (as described above). In the second, or "non-stall" embodiment, the logic circuit determines if a hit occurs, and if so, does not stall the DRAM controller but rather directly forwards the required data for the current read in lieu of any data obtained by the DRAM memory. Importantly, if the read data can be forwarded, e.g., it resides in the DRAM controller, then there is no need to process the read instruction to the memory core. In this case, if the memory core happens to provide data in response to the read, it can be discarded because the DRAM controller supplies the data.

The operational flow 500*a* is described. At step 510, a read or write command is received. The command is decoded as a write or a read by steps 512 and 514 respectively. These steps can be performed simultaneously or in any order. Upon a write being detected, its address (or a hash or a portion thereof) is stored in a history buffer. If a hash is used, then a unique hash is typically employed. Also stored (after the write data latency) is the data associated with the write. In the preferred embodiment, the data and the address information are stored in separate buffers. Like the history buffer of the stall embodiment, the history buffers of the non-stall embodiment store only a small window of previously dispatched writes. In addition to the write information being stored in the control logic, the write is also dispatched to the DRAM controller, step 532.

On the other hand, if the command is decoded to be a read, then at 516 the address (or a unique hash thereof) of the read command is compared against all of the address information maintained within the history buffer for valid writes. These compares can be done simultaneously at 518. If no hit is found, then the current read is immediately dispatched to the memory controller 524.

If a hit is determined at 518, then the logic circuit determines the latest write that matches (e.g., provided two or more writes match). The logic circuit then accesses the history buffer to locate the data associated with the matching latest write at 520. At 522, the data obtained from the history buffer is provided on the read return data bus (after the read data latency) in response to the read command. While the control logic is processing the current read, it may also have been dispatched to the memory controller. In this case, the data obtained by the logic circuit from the history buffer bypasses any data returned by the DRAM controller in response to the current read. The read instruction to the DRAM may actually be discarded in this case. The advantage of process 500 is that the memory controller need not be stalled in the read-after-write hit situation while maintaining data integrity. This increases overall memory performance.

The embodiment of FIG. 5A works well when all byte write enables from the "hit" write have been set. Then, the data can be forwarded.

Figure 5B:
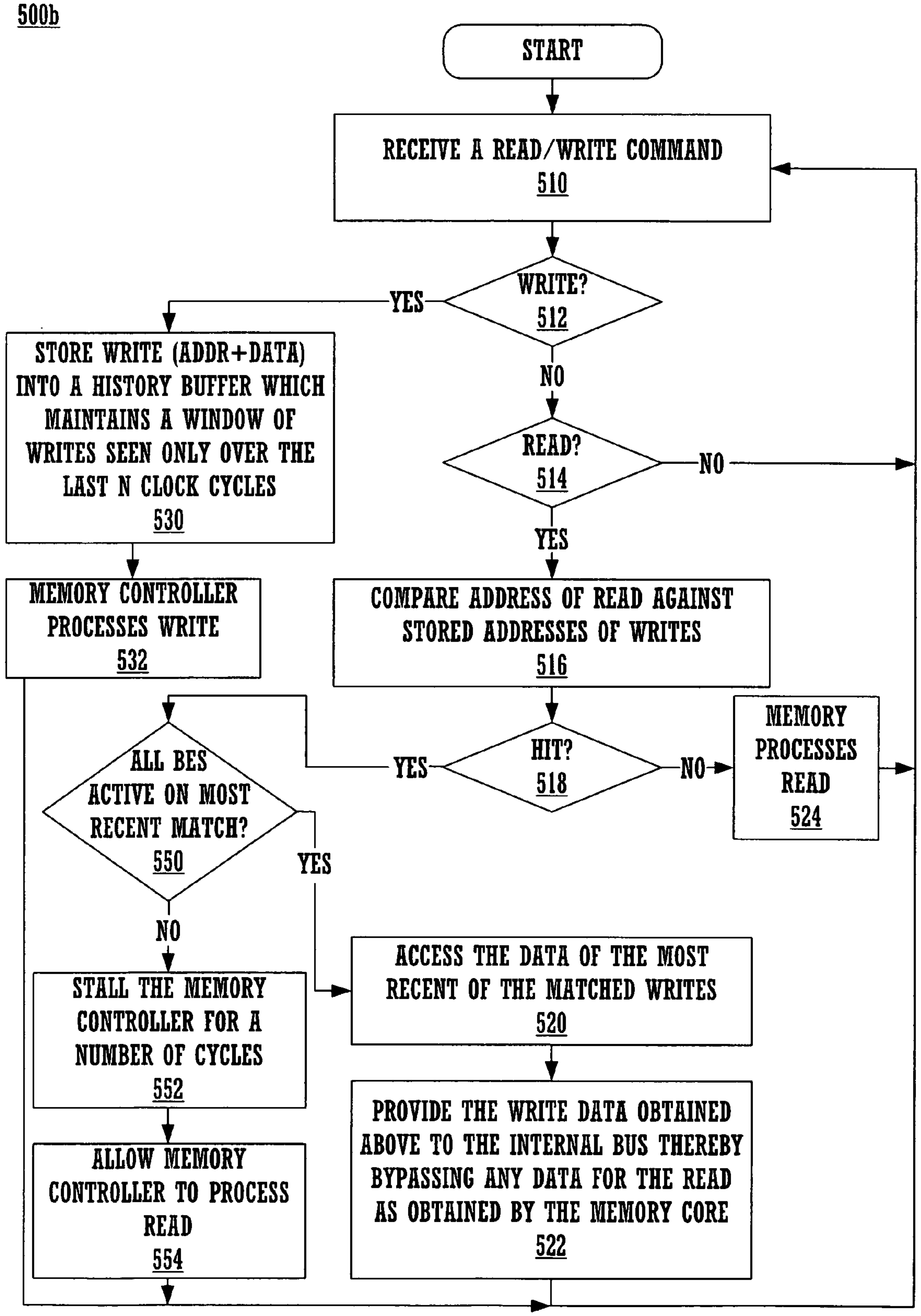
FIG. 5B flow diagram similar to the second embodiment ("non-stall embodiment") of the present invention but providing a special stall condition if all byte enables are not set.

FIG. 5B illustrates a flow 500*b* that is similar to flow 500*a* but handles the situation when a hit occurs at 518, but all the byte enables (BES) are not active on the most recent match. This condition is tested at 550. If all the byte enables are active, then step 520 is entered, as normal. However, if one or more byte enables are not active, then at step 552, the memory controller is stalled for a number of clock cycles and at step 554, the memory controller is allowed to process the read.

At step 530, the byte enable information is stored into the history buffer portion 340*d* for a write. If all byte enables for this write are active, an all_byte_enable_active bit is set.

According to the embodiment of FIG. 5B, the memory controller can be implemented such that an early copy of all write enables for a given write reference are available from the requestor. In this case, a bit (e.g., all_write_enables_active) is stored in the write address history buffer 340 that is set if all early write enables for that reference are active. Upon a read hit, if the latest hit has the all_write_enables_active bit set in 340, there is no stall, and write data is forwarded (step 522). Otherwise, the memory controller stalls (step 552) until the write completes before issuing the read (step 554). It is expected that this type of stall 552 would not be very typical.

In this embodiment, the latest write data is forwarded only when it is guaranteed that all write data is from the latest hit. Otherwise, the read is stalled until the write completes. An alternate embodiment could store all write enables for each write in element 340 and OR together the write enables from the hits, and merge the data.

Figure 6A:
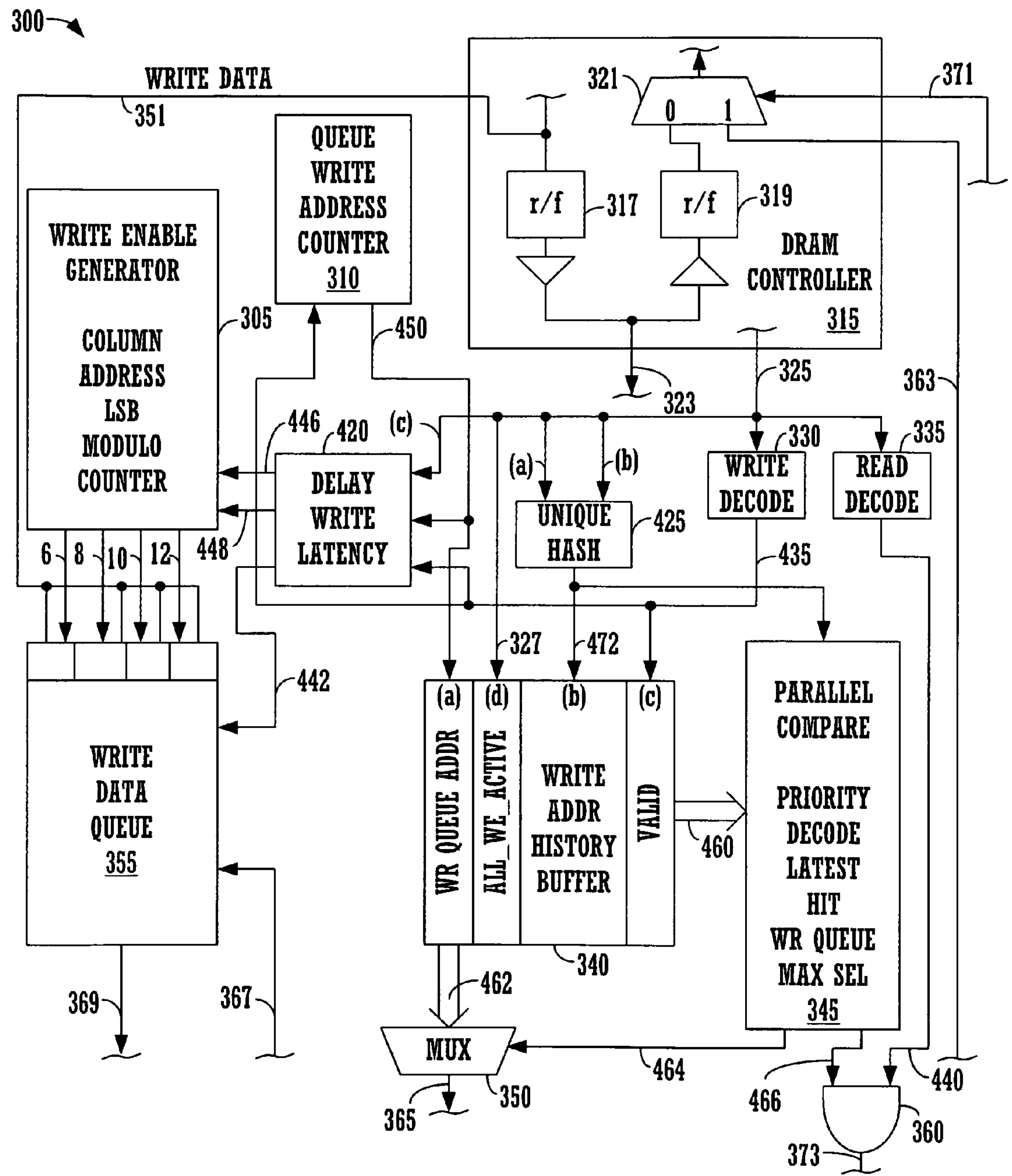
FIG. 6A and FIG. 6B illustrate a circuit diagram of a logic circuit for implementing the second embodiment of the present invention.
Figure 6B:
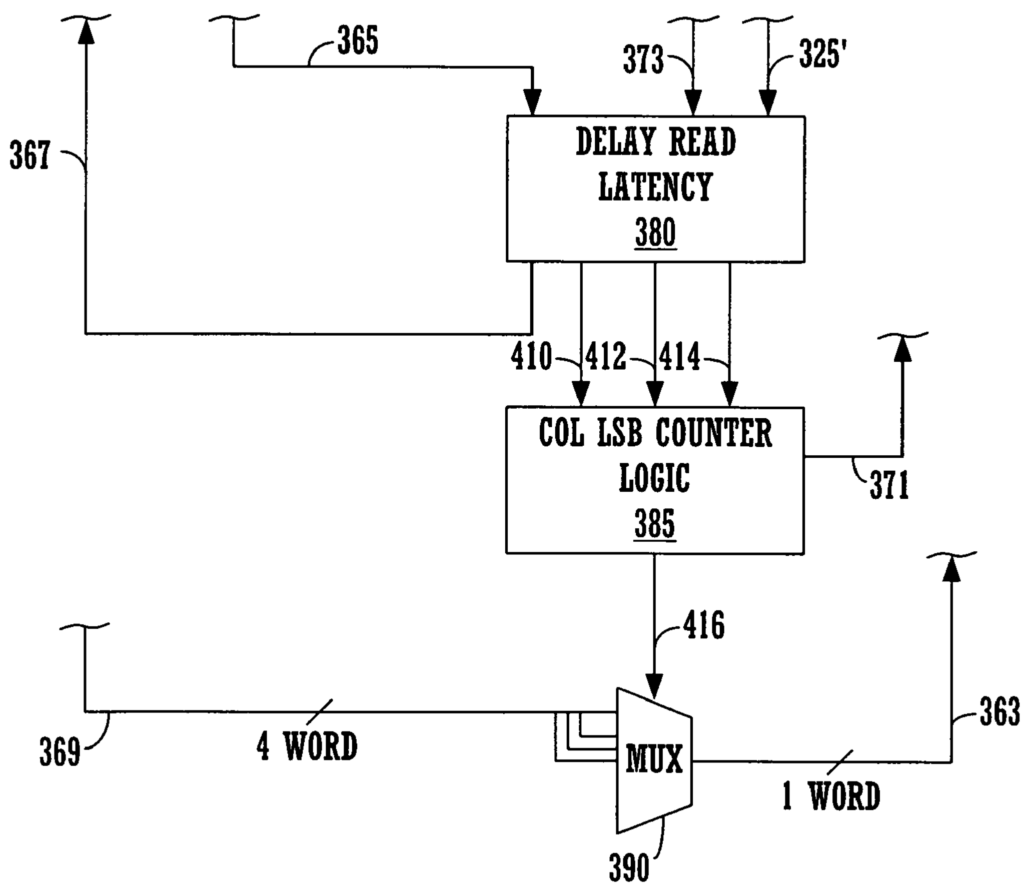

FIG. 6A and FIG. 6B illustrate a logic circuit 300 in accordance with the non-stall embodiment of the present invention. In accordance with dual data rate (DDR) techniques, data is presented on both the rising and the falling edge of the clock cycle. Circuit 300 accounts for DDR memory techniques. Specifically, the R/F circuits 317 and 319 are data conversion circuits and are capable of obtaining data from either the rising or the falling edge of the clock by selecting either the upper half or the lower half of the data bus. Bus 323 is coupled to the DRAM data pins and is buffered and coupled to both R/F circuits 317 and 319. RF circuit 317 is coupled to the write data bus 351, which is twice the width of the DRAM data bus 323 in one implementation. The data bus 323 is bi-directional, in one implementation.

The output of the bypass multiplexer 321 is coupled to the read data return data bus and performs the read data bypass function. As such, the multiplexer 321 either provides the data from the DRAM data pins (e.g., position "0" through RF circuit 319) or returns the data obtained from a write data queue 355 over bus 363 (e.g., position "1"). Control signals over line 371 control the bypass functionality. The mechanism used by control logic 300 for obtaining the bypass data (over bus 363) and for generating the bypass signal (line 371) is described below.

Generally, address collision detection is performed in a way analogous to the stall embodiment described with respect to FIG. 3B. Upon a collision, the write data is forwarded such that it will appear on the bus 351 after time tWL (the write latency) from the write CAS control. Control is therefore delayed to route this data using a delay write latency circuit 420. Issues resulting from multi-cycle data transfers and variable read/write column start addresses are also addressed. The preferred embodiment may use the write data before it goes through logic that multiplexes it onto the rising and falling edges to the DRAM to reduce circuit complexity. Similarly, the read data is forwarded after logic that combines rising and falling edge read data captured from the DRAM.

Referring to FIG. 6A, the DRAM controller 315 supplies the non-data signals, also called reference bus signals, over bus 325. Signals on bus 325 include the RAS signals, CAS signals, write enables (WE_), chip select control (CS_), address signals, early write enables, and bank signals, etc., for the memory. These signals are well known. This reference bus 325 is coupled to the write decode 330, the read decode 335 and the LSB bits of the column address (col[1:0]) of bus 325 is coupled to the delay write latency circuit 420. The early write enable signals are forwarded to the history buffer 340 via bus 327. Bank information 325(*a*) and column address information 325(*b*) are forwarded from the reference bus 325 to the hash circuit 425. In one embodiment, a unique hash is used. From this information, the hash circuit 425 generates a key over bus 472 for the read/write command. Key bus 472 is coupled to history buffer 340 and to parallel compare circuit 345. On every clock cycle, key information is shifted into portion 340*b* of the history buffer and old key information drains from the bottom.

Write decoder 330 generates a write valid signal which is carried over line 435 to history buffer 340, delay write latency circuit 420 and to a queue write address counter 310. On every clock cycle, a valid write bit is shifted into portion 340*c* of the history buffer and an old valid bit drains from the bottom. The read decoder 335 generates a read valid signal which is presented over line 440 to AND gate 360.

History buffer 340 contains entries, each of which is used to store: (1) write address information in portion 340*b*; (2) write valid bit information in portion 340*c*; (3) a write queue address in portion 340*a* which is an address of the write data queue 355; and (4) a portion 340*d* to contain an all_write_enable_active bit (BES) for each entry. At this address, the write data associated with the write entry is stored. For each valid write entry, a new write queue address is added to (e.g., shifted into) portion 340*a*. On each clock, the history buffer 340 moves its contents down by one entry, analogous to the history buffer of FIG. 3B, with the data in the last entry being discarded on the next clock cycle.

The queue write address counter 310 generates the queue address that is used to access the write data queue 355 and a new queue address is generated for each write. This queue address is presented over bus 450 which is coupled to delay write latency circuit 420 and also the history buffer portion 340*a*. It is appreciated that since the data portion may span multiple clock cycles, the write data is not stored in history buffer 340 that shifts and "drains" on each clock, but rather is stored in the write data queue 355. The queue write address counter 310 generates addresses that wrap around from the max to the min address.

Since the data for a write is delayed by the write data latency period from its corresponding write command, the delay write latency circuit 420 provides the proper timing to synchronize the write data with its address and valid information (in the history buffer 340). The delay write latency circuit 420 provides a queue write address over bus 442 in coincidence with the write data appearing on bus 351. The delay write latency circuit 420 also provides a start write signal over line 446 and the two LSB column address bits 448 to the write enable generator 305. Circuit 305 is a modulo counter and controls write enable signals 6-12 (e.g., we_0, we_1, we_2 and we_3) which are coupled, respectively, to four words of the write data queue 355. According to DDR memory techniques, the ordering of the words on the data bus 351 could be: 1) 0, 1, 2, 3; or 2) 1, 2, 3, 0; or 3) 2, 3, 0, 1; or 4) 3, 0, 1, 2, depending on the address of the write. The LSB bits of the write address will dictate the proper word ordering. Two or more of the write enables 6-12 are active at any clock cycle because the data width of bus 351 is twice the data width of the DRAM data pins. These write enable signals control the order in which the write data burst from bus 351 is stored into an entry of the write data queue 355 in accordance with a modulo ordering.

In operation, upon detecting a write, the queue write address counter 310 increments to generate a new write data queue address for a subsequent write. The current queue write address is then shifted into the write history buffer 340 along with the write's write address and a valid bit. The queue write address is stored in entry portion 340*a*, the write address is stored in entry portion 340*b* and the valid bit is stored in entry portion 340*c*. From bus 450, the queue write address for the write is also stored in the delay write latency circuit 420 for directing the delayed write data to a location in the write data queue. From bus 448, the lower column address bits of the write address are also delayed in the delay write latency circuit 420 and used to control the write enables 6-12 of circuit 305.

After the write latency period, the delay write latency circuit 420 outputs a write_start signal over line 446, the LSB column bits over bus 448 and the stored write data queue address over bus 442. Bus 442 addresses a spare entry within write data queue 355 at the time when the write data is appearing over data bus 351. The write may not start with the lower column address bits being zero, therefore, the write data is written to the correct positions in the write data queue entry according to the write enable signals 6-12. More specifically, the control logic of circuit 305 has a counter that advances the write enables modulo style as the write is issued every clock for the length of the burst. A system that handles partial byte enables can deal with write burst interrupts (typically of 8 to 4 clocks).

Upon detecting a read, address collisions are detected using the mechanism described with respect to the stall embodiment of FIG. 3B. A parallel compare of the enabled and valid write addresses of the history buffer 340 is performed by circuit 345 of FIG. 6A against the address of the current read (which is presented over bus 472 to circuit 345). Enabled and valid write address information is presented over bus 460 to the compare circuit 345. CAM circuitry can be used in compare circuit 345 to efficiently perform a parallel compare function. Although not shown in FIG. 6A, an interlock time configuration circuit (as shown in FIG. 3B) can be applied to adjust the length of the enabled entries in the history buffer 340. A resulting hit (e.g., an address collision) activates a hit signal over line 466. The hit signal is ANDed (by gate 360) with the read decode (line 440) to produce a valid hit signal over line 373.

Importantly, on a hit, circuit 300 also selects and outputs the queue write address of the latest matching write of the history buffer 340. In other words, in the situation where multiple writes of the history buffer 340 match the read, the compare circuit 345 not only detects the hit situation, but also determines the latest write that matches the read address. The "latest" write hit is that write hit that is stored in the upper most entry in the buffer. This ensures that the current read obtains the most recent write data, e.g., the newest. A priority decoder detects the latest write location. (This would be more complex if byte writes were allowed as the byte enables and data from the hits would need to be merged). As a result, compare circuit 345, in addition to generating a hit signal over line 466, also generates an entry number of the write history buffer entry that corresponds to the latest matching write. This information is presented over bus 464 and controls multiplexer 350. Bus 464 controls multiplexer 350 to select the write data queue address of the latest matching write from the history buffer portion 340*a*. This write data queue address will be used to address the write data queue 355 (after the read data latency) to obtain the proper write data. It is appreciated that all entries of the history buffer portion 340*a* are coupled to the input of the multiplexer 350 over bus 462.

Refer to FIG. 6A and FIG. 6B. Bus 365 from the multiplexer 350 (FIG. 6A) is coupled to delay read latency circuit 380. The valid read hit signal of line 373 is also coupled to delay read latency circuit 380. Lastly, the LSB two bits of the column address of the current read are coupled to delay read latency circuit 380 over bus 325'. Delay read latency circuit 380 delays the read data for the current read according to the read data latency of the memory. As a result, the write data queue address (from bus 365), the lower read column address bits (from bus 325') and the hit signal (from line 373) are delayed for the read data latency time. The lower read column address bits of line 325' are needed as the read address may not start on the zero boundary with respect to those bits.

After the read data latency time, the write data queue 355 (FIG. 6A) is addressed by the delayed write data queue address which is presented over read bus 367 by circuit 380. This causes the corresponding data stored at that queue address to be presented over bus 369. Therefore, the write data queue read address is used to read the write data from the write data queue 355. The four words of bus 369 are coupled to respective inputs of multiplexer 390 of FIG. 6B.

The multiplexer 390 is controlled by bus 416 which is generated by a column LSB counter logic circuit 385. Circuit 385 is a modulo counter that receives the delayed valid hit signal over line 410, the delayed LSB column bits over bus 412 and a column start address over bus 414. Circuit 385 also generates the bypass signal over line 371 which controls the bypass multiplexer 321 of the DRAM controller 315. The bypass signals is essentially the delayed valid signal from bus 373 but may span multiple clocks as read data is presented. The lower delayed column read address bits (bus 412) are used by circuit 385 to control the multiplexing of the correct portion of data to the DRAM controller 315 at the correct starting point. Multiplexer 390 performs the multiplexing function and selects one word per clock cycle and outputs the selected word (on the rising edge of the clock) over bus 363 which is coupled to an input of the bypass multiplexer 321 of DRAM controller 315. A modulo counter within circuit 385 steps through these lower column bits for the duration of the multi-cycle read. Bypass select (line 371) is asserted to substitute this forwarded data for the stale read data that may arrive from the DRAM core. The output of the bypass multiplexer 321 is coupled to the read return data bus.

The embodiment of FIGS. 6A and 6B may be incorporated with the returning stale DRAM data to fully combine valid forwarded read data in the case of address collision. According to one alternative embodiment, this mechanism can also be incorporated into the DRAM itself.

The write history buffer 340 and the parallel compare circuit 345 can be implemented with a CAM, similarly to the description above.

FIG. 4 can be used to illustrate the resulting timing diagram for a read-after-write situation for the non-stall embodiment. If no hit is detected, e.g., a read-after-write miss, the read 630*a* is not stalled, and its read data 630*b* is obtained from the DRAM core. However, if a hit occurs, e.g., a read-after-write hit, no stall happens, but the read data 630*b* is obtained from the control logic 500, not from the DRAM core. In this case the DRAM read is not necessary.

The foregoing descriptions of specific embodiments of the present invention, a method and a system for improving read after write execution performance for memory systems that employ delayed write data, e.g., a dynamic random access memory (DRAM) device, have been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:

a memory comprising: a memory controller; and a memory core interfacing with said memory controller, wherein said memory operates with a read data latency and a similar write data latency, and wherein further said memory immediately processing a read in a read-after-write situation;

a control circuit for controlling said memory, said control circuit for detecting an address collision based on bank and column bits between said read and a previously issued write and, in response thereto, said control circuit for stalling said memory by delaying issuance of said read to said memory until after said previously issued write completes, and wherein said address collision is detected by using pointers to hashed address values of said read and said previously issued write;

a history buffer for storing a plurality of previously issued writes and a plurality of write enables corresponding to said previously issued writes, said history buffer adjustable in accordance with said stalling such that each of said plurality of previously issued writes is within a window of N clock cycles before said read.

2. A system as described in claim 1 wherein said memory is dynamic random access memory (DRAM).

3. A system as described in claim 2 wherein said previously issued write is within a window of N clock cycles before said read.

4. A system as described in claim 3 wherein said control circuit stalls said memory until said window is empty of writes causing address collisions.

5. A system as described in claim 1 further comprising:

an interlock circuit coupled to said history buffer for disabling said plurality of previously issued writes stored in said history buffer in accordance with write data latencys of said plurality of previously issued writes.

6. A control circuit for interfacing with a memory controller which controls a memory core, said control circuit comprising:

a buffer memory for storing addresses of a set of previously dispatched writes and a plurality of write enables corresponding to said previously dispatched writes, said buffer memory adjustable in length in accordance with a number of said previously dispatched writes of said set;

compare logic comprising a content addressable memory circuit for performing multiple simultaneous address compares and for comparing based on bank and column bits an address of a current read against said addresses of said set of previously dispatched writes stored in said buffer memory, said compare logic for generating a hit signal upon an address match thereof, wherein said address of said current read and said addresses of said set of previously dispatched writes are accessed via pointers to hashed address values; and responsive to said hit signal, stall circuitry for stalling said memory controller for a plurality of clock cycles before said current read can be processed, and wherein said memory controller and said memory core operate with a write data latency.

7. A control circuit as described in claim 6 wherein said memory core is a dynamic random access memory (DRAM) core.

8. A control circuit as described in claim 7 wherein said memory controller and said memory core also operate with a read data latency which is similar in length to said write data latency.

9. A control circuit as described in claim 6 wherein said plurality of clock cycles is at least as long as said write data latency.

10. A control circuit as described in claim 6 wherein, provided no match is detected by said compare circuit, said memory controller allows said current read to be dispatched before completion of a preceding write in a read-after-write situation.

11. A control circuit as described in claim 6 further comprising:

interlock circuitry coupled to said buffer memory for selectively disabling said previously dispatched writes stored in said buffer memory in accordance with write data latencys of said previously dispatched writes.

12. In a memory device having a memory controller which controls a memory core, a method for efficiently executing reads that follow writes comprising:

storing addresses of a set of previously dispatched writes into a buffer and a plurality of write enables corresponding to said previously dispatched writes, said buffer adjustable in length in accordance with a number of said previously dispatched writes of said set;

comparing an address based on bank and column bits of a current read against said addresses of said set of previously dispatched writes stored in said buffer wherein said comparing is performed by a compare circuit comprising a content addressable memory (CAM) and wherein said address of said current read and said addresses of said set of previously dispatched writes are accessed via pointers to hashed address values;

generating a hit signal upon an address match of said comparing; and responsive to said hit signal, stalling said memory controller for a plurality of clock cycles before said current read can be processed by said memory controller, and wherein said memory controller and said memory core operate with a write data latency.

13. A method as described in claim 12 wherein said memory core is a dynamic random access memory (DRAM) core.

14. A method as described in claim 13 wherein said memory controller and said memory core also operate with a read data latency that is similar in length to said write data latency.

15. A method as described in claim 12 wherein said plurality of clock cycles is at least as long as said write data latency.

16. A method as described in claim 12 wherein said content addressable memory (CAM) is adapted for performing multiple simultaneous compares.

17. A method as described in claim 12 further comprising, provided said comparing does not yield a match, dispatching said current read before completing a preceding write in a read-after-write situation.

18. A method as described in claim 12 further comprising:

selectively disabling said previously dispatched writes stored in said buffer in accordance with write data latencys of said previously dispatched writes by using interlock circuitry coupled to said buffer.

19. A system comprising:

a memory comprising: a memory controller; and a memory core interfacing with said memory controller, wherein said memory operates with a read data latency and a similar write data latency, and wherein further said memory immediately processing a read in a read-after-write situation;

a control circuit for controlling said memory, said control circuit for detecting an address collision based on bank and column bits between said read and a previously issued write by using a content addressable memory to compare using pointers to hashed address values of said read and said previously issued write and, in response thereto, said control circuit for returning data for said read in lieu of any data obtained by said memory in response to said read;

a buffer within said control circuit having an adjustable length for maintaining a variable number of previously issued writes and a plurality of write enables corresponding to said previously issued writes.

20. A system as described in claim 19 wherein said memory is dynamic random access memory (DRAM).

21. A system as described in claim 20 wherein said previously issued write is within a window of N clock cycles before said read.

22. A system as described in claim 21 wherein said control circuit maintains a buffer of write information for writes encountered within said window.

23. A system as described in claim 19 further comprising:

an interlock circuit coupled to said buffer for selectively disabling said previously issued writes stored in said buffer in accordance with write data latencys of said previously issued writes.

24. A control circuit for interfacing with a memory controller which controls a memory core, said control circuit comprising:

a first buffer for storing hash addresses of a set of previously dispatched writes;

a second buffer for storing data corresponding to said set of previously dispatched writes, said first buffer and said second buffer having an adjustable length for storing a variable number of said addresses and said data, wherein said second buffer also stores write enables corresponding to said set of previously dispatched writes and wherein a bypass circuitry only supplies said data from said second buffer provided all write enables are active corresponding to said latest matching write;

compare logic for comparing, using a pointer to a hashed address value of a current read against said hash address values of said set of previously dispatched writes stored in said first buffer, said compare logic for generating a hit signal upon a match thereof, wherein said comparing is based on bank and column bits between said current read and said set of previously dispatched writes; and responsive to said hit signal corresponding to a latest matching write, said bypass circuitry for providing data from said second buffer to satisfy said current read, said data corresponding to said latest matching write, and wherein said memory controller and said memory core operate with a write data latency.

25. A control circuit as described in claim 24 wherein said write data provided from said bypass circuitry is presented on an internal bus and bypasses any data obtained from said memory core in response to said current read.

26. A control circuit as described in claim 25 wherein said bypass circuitry is a multiplexer.

27. A control circuit as described in claim 24 wherein said memory core is a dynamic random access memory (DRAM) core.

28. A control circuit as described in claim 27 wherein said memory controller and said memory core also operate with a read data latency which is similar in length to said write data latency.

29. A control circuit as described in claim 24 wherein said compare circuit comprises a content addressable memory (CAM) circuit for performing multiple simultaneous compares.

30. A control circuit as described in claim 24 wherein said memory controller is stalled before said current read is issued if all said write enables corresponding to said latest matching write are not active.

31. A control circuit as described in claim 24 further comprising:

an interlock circuit coupled to said first buffer and said second buffer for selectively disabling hash addresses and data of said previously dispatched writes in accordance with write data latencys of said previously dispatched writes.

32. In a memory device having a memory controller which controls a memory core, a method for efficiently executing reads that follow writes comprising:

storing hashed addresses of a set of previously dispatched writes into a first adjustable length buffer;

storing data corresponding to said set of previously dispatched writes into a second adjustable length buffer;

storing write enables corresponding to said set of previously dispatched writes in said second adjustable length buffer and wherein said data from said second adjustable length buffer is only provided if all write enables are active corresponding to said latest matching write;

comparing, based on bank and column bits and using pointers to hashed address values, a hashed address of a current read against said hashed addresses of said set of previously dispatched writes by using a content addressable memory configured to perform multiple simultaneous compares;

generating a hit signal upon an address match of said comparing; and responsive to said hit signal corresponding to a latest matching write, providing data from said second buffer to data bus to satisfy said current read, said data corresponding to said latest matching write and bypassing any data obtained from said memory core in response to said current read, and wherein said memory controller and said memory core operate with a write data latency.

33. A method as described in claim 32 wherein said bypassing is performed by a multiplexer.

34. A method as described in claim 33 wherein said memory controller and said memory core also operate with a read data latency that is similar to said write data latency.

35. A method as described in claim 32 wherein said memory core is a dynamic random access memory (DRAM) core.

36. A method as described in claim 32 further comprising stalling said memory controller before said current read is issued if all said write enables corresponding to said latest matching write are not active.

37. A method as described in claim 32 further comprising not issuing said current read to said memory core in response to said hit signal.

38. A method as described in claim 32 further comprising:

selectively disabling said addresses and data said of previously dispatched writes in accordance with write data latencys of said previously dispatched writes by using interlock circuitry.

39. A system comprising:

a memory comprising: a memory controller; and a memory core interfacing with said memory controller, wherein said memory operates with a read data latency and a similar write data latency, and wherein further said memory immediately processing a read in a read-after-write situation;

a control circuit for controlling said memory, said control circuit for detecting an address collision based on bank and column bits between said read and a previously issued write and, in response thereto, said control circuit for stalling said memory by delaying issuance of said read to said memory until after said previously issued write completes, and wherein said address collision is detected by using pointers to hashed address values of said read and said previously issued write;

a history buffer for storing a plurality of previously issued writes and a plurality of write enables corresponding to said previously issued writes, said history buffer adjustable in accordance with said stalling such that each of said plurality of previously issued writes is within a window of N clock cycles before said read; and an interlock circuit coupled to said history buffer for disabling said plurality of previously issued writes stored in said history buffer in accordance with write data latencys of said plurality of previously issued writes.

* * * * *